United States Patent [19]

Matsuzawa

[11] Patent Number: 4,900,380
[45] Date of Patent: Feb. 13, 1990

[54] PROCESS FOR PRODUCING INFORMATION RECORDING MEDIUM

[75] Inventor: Hideki Matsuzawa, Kanagawa, Japan

[73] Assignee: Fuji Photo Film Co., Ltd., Kanagawa, Japan

[21] Appl. No.: 260,606

[22] Filed: Oct. 21, 1988

[30] Foreign Application Priority Data

Oct. 23, 1987 [JP] Japan ................... 62-269015

[51] Int. Cl.[4] .............. B29C 65/08; B32B 31/20; G11B 7/26
[52] U.S. Cl. .................. 156/73.1; 156/290; 156/308.4; 156/583.2; 346/137; 360/135; 428/65
[58] Field of Search .......... 156/73.1, 580.1, 580.2, 156/583.2, 290, 308.4; 360/135; 346/137; 428/65

[56] References Cited

U.S. PATENT DOCUMENTS

| 3,369,954 | 2/1968 | Fener | 156/583.2 |
| 4,670,072 | 6/1987 | Pastor et al. | 156/73.1 |
| 4,785,444 | 11/1988 | Nakane et al. | 360/135 |

FOREIGN PATENT DOCUMENTS

| 51-75523 | 6/1976 | Japan. | |
| 58-203645 | 11/1983 | Japan | 156/73.1 |
| 61-104345 | 5/1986 | Japan. | |

Primary Examiner—Michael Wityshyn
Attorney, Agent, or Firm—Sixbey, Friedman, Leedom & Ferguson

[57] ABSTRACT

A process for producing an information recording medium such as an optical disc comprises the steps of: putting a disc-shaped resin film having a hole at its central part upon a surface of a recording layer-side of a disc-shaped resin substrate having a hole at its center; and joining the resin film to the resin substrate by thermal welding in an outer-side non-recording zone of the substrate and by ultrasonic welding in an inner-side non-recording zone of the substrate.

3 Claims, 2 Drawing Sheets

PROCESS FOR PRODUCING INFORMATION RECORDING MEDIUM

BACKGROUND OF THE INVENTION

1. Field of the invention

The present invention relates to a process for producing an information recording medium. More particularly, it relates to a process for producing an information recording medium comprising joining a disc-shaped resin film to a disc-shaped resin substrate.

2. Description of prior art

Information recording medium using high energy density beam such as a laser beam have been developed in recent years and are now put into practical use. The information recording medium is called optical disc and can be used as video disc, audio disc and disc memory for large-capacity static image files and large-capacity computers.

The optical image files basically comprises a recording layer provided on a disc-shaped transparant substrate of a plastic material or glass. An undercoat layer or intermediate layer of a high-molecular material can be provided on the surface (on which the recording layer is provided) of the substrate from the viewpoints of improving smoothness of the surface, adhesion between the substrate and the recording layer and the sensitivity of the optical disc.

The recording layer is susceptible to external influences so that it must be protected from the external influences. Thus, there are generally used optical discs having an air sandwich structure where a substrate having a recording layer thereon is joined to another substrate which may have a recording layer via inner and outer spacers in such a state that the recording layer is positioned inwards.

However, the optical disc having an air sandwich structure has disadvantages in that the manufacturing process thereof is complicated and, as a result, the manufacturing cost thereof is high and further in that the thickness of the disc is large and hence it may give difficulty in handling.

In order to solve the above-described problems, there was proposed a method in which a disc-shaped resin film is joined to a surface of the substrate, on said surface side of substrate being provided the recording layer (see, Japanese Patent Provisional Publication No. 51(1976)-75523). In this method, the film is joined to the disc substrate by means of an adhesive in the course of assembly of the optical disc. In order to bond the members to one another by an adhesive, it takes from tens of seconds to several minutes to coat and cure the adhesive for the preparation of one disc, consequently there is difficulty in mass-producing the disc. Further, there is possibility that the adhesive is squeezed out on the outer and inner peripheries of the substrate or on the side on which the recording layer is provided, when the film is joined to the substrate. When the adhesive is squeezed out on the recording layer side of the substrate, the adhesive sticks to the recording layer and as result, the recording layer may deteriorate. Further, there is a problem that the sheet-form film is apt to be peeled off from the substrate by environmental change or with the passage of time, when they are joined to each other by means of an adhesive.

Japanese Patent Provisional Publication No. 61(1986)-104375 proposes a joining method wherein the sheet-form film is joined to the substrate by means of sewing, baking, adhesive tape, pining and nailing in addition to the use of the adhesive.

However, these methods cause the following problems. The joining by pinning or nailing has problems in that the manufacturing process is complicated and there is possibility that the film is broken during handling at a position where the film is fixed, since the film is thin. The joining by sewing or adhesive tape has also disadvantages in that the manufacturing process is complicated, thread or tape is aged with the passage of time and the joint deteriorates or the appearance is spoiled.

The joining by baking, namely, thermal welding in general, is a method of joining the resin film to the substrate by dissolving the film, which can keep good joining of the resin film to the substrate over a long period of time. However, the present inventor has confirmed that in case of thermal welding being made to join the resin film to the substrate in both an inner-side non-recording zone provided around the periphery of the hole and an outer-side non-recording zone provided inside the outer periphery of the substrate, the welding requires large heat so that there is caused heat srinkage on the resin film after the joining by baking. The shrinkage likely causes deformation such as a warp of the substrate.

SUMMARY OF THE INVENTION

It is an object of the present invention to provide a process for producing an information recording medium, wherein the resin substrate is less deformed.

It is another object of the present invention to provide a process for producing an information recording medium which enables the joining of the resin film to the resin substrate to be firmly kept over a long period of time with substantially no deterioration of the recording layer by heat being generated.

The present invention provides a process for producing an information recording medium which comprises the steps of:

putting a disc-shaped flexible resin film having a hole at its central part upon a surface of the recording layer-side of a disc-shaped resin substrate having such a structure that a hole is provided at its central part, an inner-side non-recording zone (area) is provided around the periphery of the hole, an outer-side non-recording zone (area) is provided inside the outer periphery of the substrate and a recording layer is provided between said inner-side zone and said outer-side non-recording zone on the substrate; and, joining said resin film to said resin substrate (area) by thermal welding in the outer-side non-recording zone of the substrate, and by ultrasonic welding in the inner-side non-recording zone (area) of the substrate.

As described above, the joining of the resin film to the resin substrate in both inner and outer side of non-recording zones by conventional thermal welding generates large heat in welding parts which causes heat shrinkage on the resin film. The resin substrate, consequently, tends to be warped by the tension caused by the shrinkage of the resin film. Further study of the present inventor has succeeded in obtaining an information recording medium with reduced warp by using the present invention, wherein thermal welding is utilized in joining the resin film to the substrate in the outer-side non-recording zone, while ultrasonic welding is utilized in the inner-side non-recording zone which does not generate large heat and hence hardly causes heat shrinkage.

On the other hand, the method of joining the resin film by ultrasonic welding in the outer-side non-recording zone of the substrate and joining by thermal welding in the inner-side non-recording zone of the substrate can be considered. However, ultrasonic welding generally is a technique of which welding is carried out by applying ultrasonic vibration, which requires larger energy in accordance with increase of the size of welding area. Thus, the ultrasonic welding which requires large heat is apt to make the resin film vibrate and causes damage of the recording layer on the surface of the resin substrate, thereby it requires considerable care in the course of joining. Accordingly, the present invention employs ultrasonic welding only in the inner-side non-recording zone of the substrate to join the resin film.

In the process for the production of an information recording medium according to the present invention, the joining of the resin film to the substrate is made by the combination of thermal welding in the outer-side non-recording zone and ultrasonic welding in the inner-side non-recording zone. Accordingly, the resin substrate is unlikely influenced by heat shrinkage of the resin film, whereby make it possible to obtain an information recording medium with reduced deformation.

Further, in the process for the production of the information recording medium according to the invention, the joining of the resin film to the resin substrate is done by welding, so that the peeling off of the resin film from the substrate in the course of change in environmental conditions with the passage of time is remarkably reduced, and the good joining can be kept over the long period of time.

Accordingly, in the information recording medium produced according to the invention, the recording layer can be protected by the resin film and recording characteristics are maintained stably over a long period of time.

BRIEF DESCRIPTION OF THE DRAWINGS

Each of FIGS. 1 and 2 is a sectional view showing each step of manufacturing process of an information recording medium according to the present invention.

DETAILED DESCRIPTION OF THE INVENTION

The present invention will be described in more detail by referring to the accompanying drawings.

Figure 1:
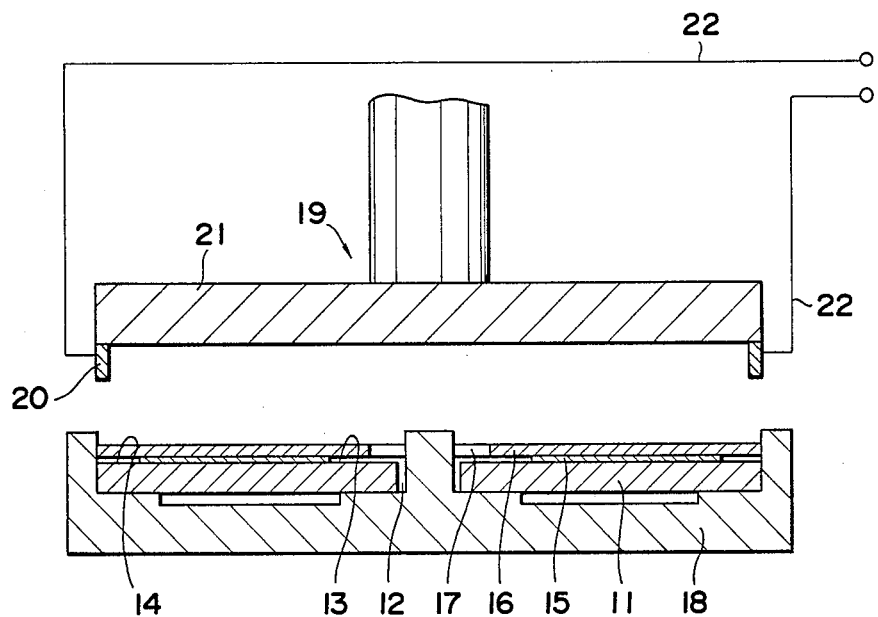
Figure 2:
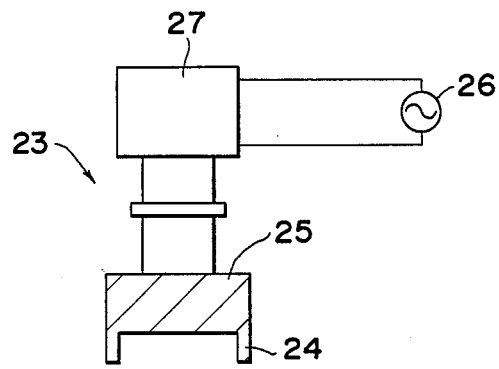
Figure 2:
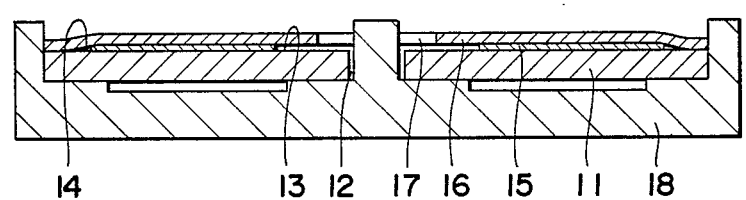

FIG. 1 and 2 are given to illustrate in combination an embodiment of a manufacturing process of an information recording medium according to the invention.

Referring to FIG. 1, a disc-shaped resin substrate 11 having such a structure that a hole 12 is provided at its central part, an inner-side non-recording zone 13 is set around outside the periphery of the hole 12, an outer-side non-recording zone 14 is set inside the outer periphery of the resin substrate 11, and a recording layer 15 is provided between each said non-recording zone.

A disc-shaped flexible resin film 16 is put upon a surface of recording layer-side 15 of the disc-shaped resin substrate 11. The resin film 16 is provided with a hole 17 at its central part. Then, the resin substrate 11 on which the resin film 16 is put upon is placed in a receiving tool 18 in such a manner that the resin substrate 11 is in contact with the holding part of the receiving tool 18.

In the first process, the resin film 16 is welded to the outer-side non-recording zone 14 of the resin substrate 11 by means of an impulse sealer 19. The impulse sealer 19 comprises a ring-form seal bar 20 of resister supported by an application board 21. It is preferable that feeders 22 are connected to the ring-form seal bar symmterically to each other to avoid ununiformity of heat generating on the seal bar. The application board 21 has insulating property and thermal insulating property.

Welding is carried out by descending the ring-form seal bar 20 with the application board 21. The ring-form seal bar 20 presses said substrate 11 at the position corresponding to the outer-side non-recording zone 14 of said substrate 11. While keeping this state, electric current is applied instantaneously on the ring-form seal bar 20 to make it heat generate. In this manner, said resin film is welded to the outer-side non-recording zone 14 of said resin substrate 11.

Referring to FIG. 2, on the second process, the resin film 16 is welded to the inner-side non-recording zone 13 of the resin substrate 11 by an ultrasonic welding machine 23. The ultrasonic welding machine 23 comprises an applying horn 25 which is provided with the ring-shaped raised portion 24 for application of ultrasonic wave. Ultrasonic wave is generated from an ultrasonic generator 26, transmitted through a converter 27 then applying to the horn 25.

In the course of welding, the applying horn 25 of the ultrasonic welding machine 23 is descended to press said resin film 16 by the ring-shaped raised portion in the place corresponding to the the inner-side non-recording zone 13 of the said resin substrate 11. While keeping this state, ultrasonic wave is applied to the applying horn 25 to weld the resin film 16 to the resin substrate 11 in the inner-side non-recording zone 13.

In the process for producing an information recording medium according to the invention, the joining of the resin film to the resin substrate is carried out in the outer-side non-recording zone by thermal welding for the first step, and in the inner-side non-recording zone by ultrasonic welding for the second step, which is preferable in that it enables the joining procedure smoothly accomplished.

As stated above, the welding of outer-side non-recording zone of the resin substrate made by the impulse sealer is preferable in that it causes smaller heat shrinkage than usual thermal welding due to instantenous application of heat only to the welding portion.

It is preferred to provide a ring-shaped energy director on either of the welding area of the resin substrate or the resin film to weld them by ultrasonic welding, because it enables the welding to be easily performed. Moreover, it is preferred to provide protrusions on the application surface of the ring-form raised portion of the ultrasonic welding machine in such a manner that the protrusions form a pattern in a radial form wherein a plurality of lines radiate from the center of the ring, or in a lattice form or in the form of a plurality of dots. When welding is carried out through them, the cross section of the resin film pressed by said protrusions are deformed to have shapes corresponding to the cross section of the protrusions, which functions as energy directors. This is especially preferable, because welding can be accomplished easily without providing an energy director on either resin substrate or the resin film.

Figure 3:
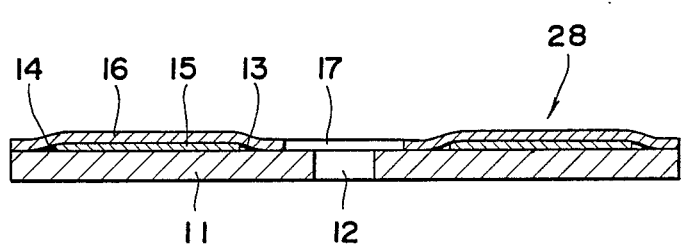
FIG. 3 is a sectional view showing an embodiment of an information recording medium produced by combination of the steps shown in FIGS. 1 and 2.

FIG. 3 shows the information recording medium 28 obtained by the manufacturing process illustrated by FIGS. 1 and 2 in combination. A disc-shaped resin film 16 having a hole 17 at its central part is joined to a disc-shaped resin substrate 11 having a hole 12 at its central part, on said surface side of substrate being provided with the recording layer 15. The joining of the two members is carried out by welding by impulse seal in the outer-side non-recording zone 14, and by ultrasonic wave in the inner-side non-recording zone.

While the manufacturing process of the information recording medium shown FIGS. 1 and 2 is in accordance with the present invention, the invention is by no means limited to the embodiments described above.

For example, the order of the welding of the resin film to the resin substrate by impulse seal in the outer-side non-recording zone and by ultrasonic welding in the inner-side non-recording zone may be changed.

Further, the application surface of the ring-shaped seal bar of the impulse sealer can be provided with series of dents making such patterns in radial form wherein a plurality of lines radiate from the center of the ring, or in lattice form, or a plurality of dots, and welding can be made with them. If desired, a release material tape such as polyfluoroethylene tape may be attached to the application surface of the seal bar so that the separation of the seal bar from the resin film after the welding would be performed easily.

Also, the ring-form raised portion for applying thermal welding or the ring-form seal bar for applying ultrasonic welding may be provided with some dents in order to enable air freely passing through between the space formed on the recording area made by the joining of the two members with outside space, and thereby leave some non-contact portion on welding parts of the resin substrate and the resin film.

Furthermore, a disc-shaped resin substrate may not be flat as described above, but also it may be a substrate provided with a ring-form raised portion functioning as spacer in the inner-side non-recording zone, and the disc-shaped resin film is welded in said ring-form raised portion and the outer-side non-recording zone in such a manner that the resin film is substantially not in contact with the recording layer.

Subtrates, recording layers and films which are conventionally used, can be used in the production of the information recording medium of the present invention. These matters will be briefly described below.

Materials for the substrates, which are used in the invention can be chosen from materials which are conventionally used as substrates for information recording mediums. Acrylic resins such as cell cast polymethyl methacrylate, injection-molded polymethl methacrylate and polymethyl acrylate; vinyl choloride resins such as polyvinyl chloride and vinyl chloride copolymers; epoxy resins; amorphous polyolefins; and other synthetic resins such as polycarbonate are preferred as substrate materials from the viewpoints of optical characteristics, surface smoothness, processability, handling properties, long-term stability and manufacturing cost. Polymethyl methacrylate, polycarbonates and epoxy resins are preferred from the viewpoints of dimensional stability, transparency and surface smoothness.

On the surface side of the substrate, on which the recording layer is provided, there may be provided an undercoat layer (and/or an intermediate layer) to improve surface smoothness and adhesion, and to prevent the recording layer from being deteriorated.

Examples of materials for the preparation of the undercoat layer and/or the intermediate layer include polymer material such as polymethyl methacrylte, acrylic acid-methacrylic acid copolymer, nitrocellulose, polyethylene and polycarbonate; organic materials such as silane coupling agent; and inorganic material such as inorganic oxides (e.g., $SiO_2$, $Al_2O_3$, etc.) and inorganic flourides (e.g., $MgF_2$, etc.).

Examples of materials which can be used for the formation of the recording layer include metals such as Te, Zn, In, Sn, Zr, Al, Ti, Cu, Ge, Au and Pt; semimetals such as Bi, As and Sb; semiconductors such as Si; alloys of these elements; and mixtures thereof. Further, the compounds of these metals, semimetals and semiconductors such as sulfides, oxides, borides, silicates, carbides and nitrides and mixtures of these compounds and said metal can be used as the materials of the recording layers. Dyes, combinations of a dye and a polymer, combinations of a dye and the above metal and combinations of dye and the above semimetal can also be used for the formation of the recording layer.

Further, the conventional metals, semimetals or compounds may be contained in the recording layer.

The recording layer can be formed on the substrate directly or through an undercoat layer by means of metallizing, sputtering, ion plating or coating. The recording layer may be composed of a single layer or two or more layers. The thickness of the layer is generally in the range of 100 to 5,500 A, preferably 150 to 1,000 A from the viewpoint of optical density required for optical information recording.

On the surface of the substrate (said surface being not provided thereon with the recording layer), there may be provided a thin film of an inorganic material (e.g., silicon dioxide, tin oxide or magnesium flouride) or a polymer material (e.g., a thermoplastic resin or a photocurable resin) by means of vacuum metallizing, sputtering or coating to enhance abrasion resisitance and moisture proofness.

Examples of materials for the disc-shaped resin film include thermoplastic resins such as acrylic resins, vinyl chloride resins, polystyrene resins, polyamide resins, polyoefin resins (e.g., polypropylene, polyethylene, etc.), polycarbonate resins, polyester resins and polyvinyl chloride resins. The materials are by no means limited thereto and any of materials can be used, so long as they can be well welded to the substrate by ultrasonic welding method.

It is desirable that the same material as that for the substrate is used as the film material in the present invention. The thickness of the resin film is generally in the range of 10 to 500 $\mu$m, preferably 50 to 100 $\mu$m.

I claim:

1. A process for producing an information recording medium which comprises the steps:

putting a disc-shaped resin film having a hole at a central part thereof upon a surface of a recording layer-side of a disc-shaped resin substrate having such a structure that a hole is provided at a central part thereof, an inner-side non-recording zone is provided around the pheriphery of the hole, an outer-side non-recording zone is provided inside the outer periphery of the substrate and a recording layer is provided between said inner-side non-recording zone and said outer-side non-recording zone on the substrate; and joining said resin film to said resin susbstrate by thermal welding in the outer-side non-recording zone of the substrate, and by ultrasonic welding in the inner-side non-recording zone of the substrate.

2. The process for producing an information recording medium as claimed in claim 1, wherein the joining of said resin film to said resin substrate comprises:

the first stage comprising the steps of:

putting said disc-shaped resin film upon a surface of a recording layer-side of said disc-shaped resin substrate, placing the resin film and resin substrate in a receiving tool in such manner that the resin substrate is arranged in contact with a holding part of the receiving tool, pressing said resin film by an impulse sealer provided with a ring-form seal bar made of resistive element supported by an application board at the position corresponding to the outer-side non-recording zone of said resin substrate, applying electric current instantaneously to the seal bar for generation of heat therein, and welding said resin film to said substrate in the outer-side non-recording zone; and, the second stage comprising the steps of:

pressing said resin film by a ring-shaped raised portion of an ultrasonic welding machine provided with an applying horn which has said ring-shaped raised portion for applying ultrasonic wave at the position corresponding to the inner-side non-recording zone of said substrate, applying ultrasonic wave to the applying horn, and welding said resin film to said resin substrate in the inner-side non-recording zone.

3. The process for producing an information recording medium as claimed in claim 1, wherein said step of joining said resin film to said resin substrate is performed to leave a non-contact area therebetween so as to let air freely pass between a space formed by the resin film and resin substrate and outside of the medium.

* * * * *